(12) United States Patent
Berthomieu et al.

(10) Patent No.: US 8,166,865 B2
(45) Date of Patent: May 1, 2012

(54) BRAKE BOOST SENSOR FEELER

(75) Inventors: Bruno Berthomieu, Barcelone (ES); Francisco Carles, Saint Witz (FR); Joan Simon Bacardit, Barcelone (ES)

(73) Assignee: Robert Bosch GmbH, Stuttgart (DE)

( * ) Notice: Subject to any disclaimer, the term of this patent is extended or adjusted under 35 U.S.C. 154(b) by 795 days.

(21) Appl. No.: 12/265,889

(22) Filed: Nov. 6, 2008

(65) Prior Publication Data
US 2009/0126560 A1 May 21, 2009

(30) Foreign Application Priority Data
Nov. 6, 2007  (FR) ...................................... 07 07806

(51) Int. Cl.
*B60T 13/57* (2006.01)
*B60T 13/575* (2006.01)
(52) U.S. Cl. ..................................................... 91/369.2
(58) Field of Classification Search .................. 91/369.2
See application file for complete search history.

(56) References Cited

U.S. PATENT DOCUMENTS

| | | | | |
|---|---|---|---|---|
| 5,819,633 A * | 10/1998 | Satoh | ............................ | 91/369.2 |
| 5,943,938 A * | 8/1999 | Okuno et al. | ................. | 91/369.2 |
| 6,209,441 B1 * | 4/2001 | Takaku et al. | ................. | 91/369.2 |
| 6,269,731 B1 * | 8/2001 | Gautier et al. | ................. | 91/369.2 |
| 6,494,125 B2 * | 12/2002 | Hannus et al. | ................. | 91/369.2 |
| 6,739,234 B2 | 5/2004 | Zinndorf et al. | | |
| 6,802,240 B2 | 10/2004 | Kobayashi | | |

FOREIGN PATENT DOCUMENTS
EP   1847433        10/2007
EP   1847433 A2 *   10/2007

OTHER PUBLICATIONS
FR 0707806 Search Report.
* cited by examiner

*Primary Examiner* — Thomas E Lazo
(74) *Attorney, Agent, or Firm* — Michael Best & Friedrich LLP

(57) ABSTRACT

A sensor feeler device for a brake booster. The sensor feeler device (4) includes an axially moveable cylinder (40), the movement of which can be controlled by the control rod which is itself controlled by the brake pedal, a sensor feeler piston (5) able to move axially in said moving cylinder (40), and a spring (44) that tends to push the sensor feeler piston (5) forward and keep its front face substantially in the same plane as the front face of the moving cylinder.

27 Claims, 4 Drawing Sheets

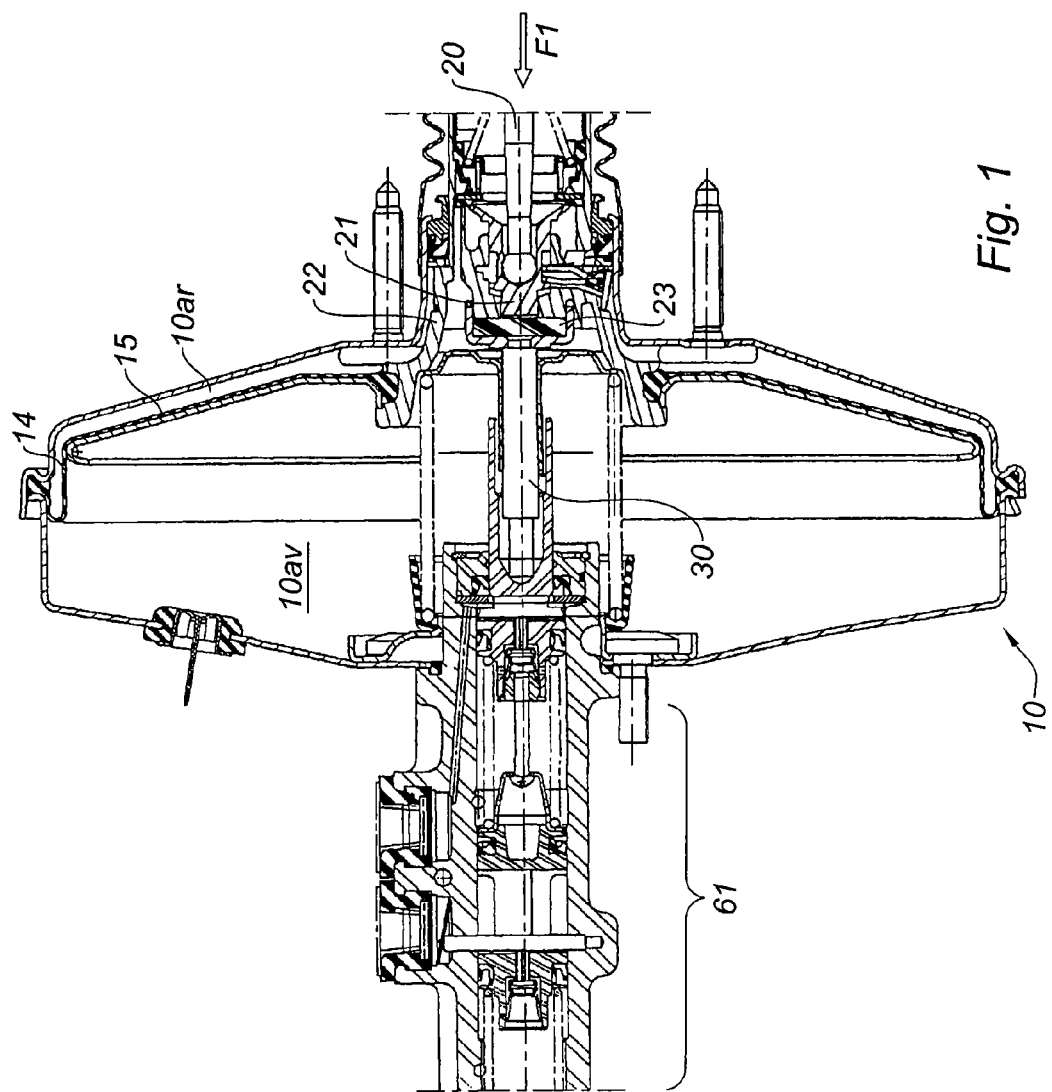

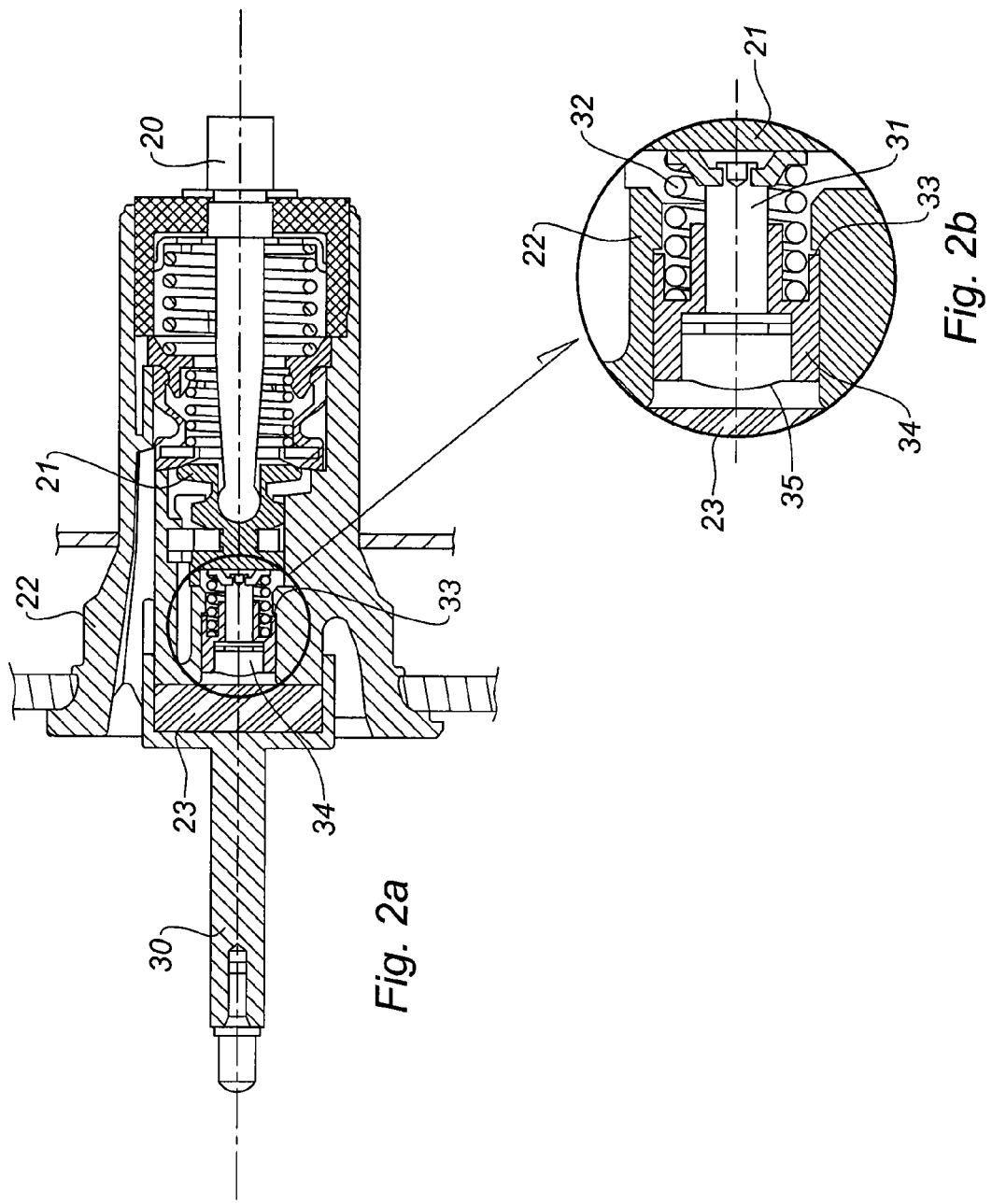

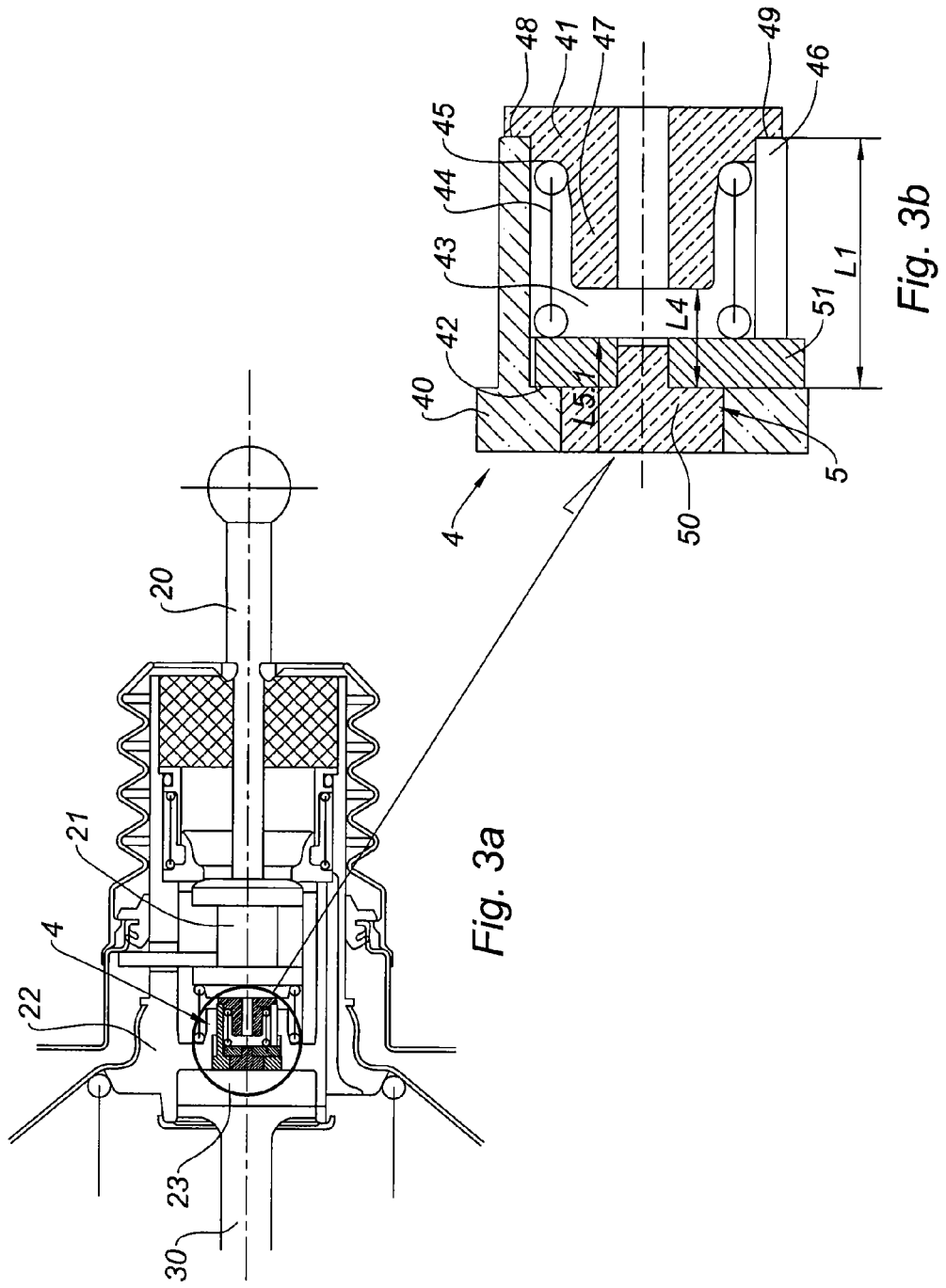

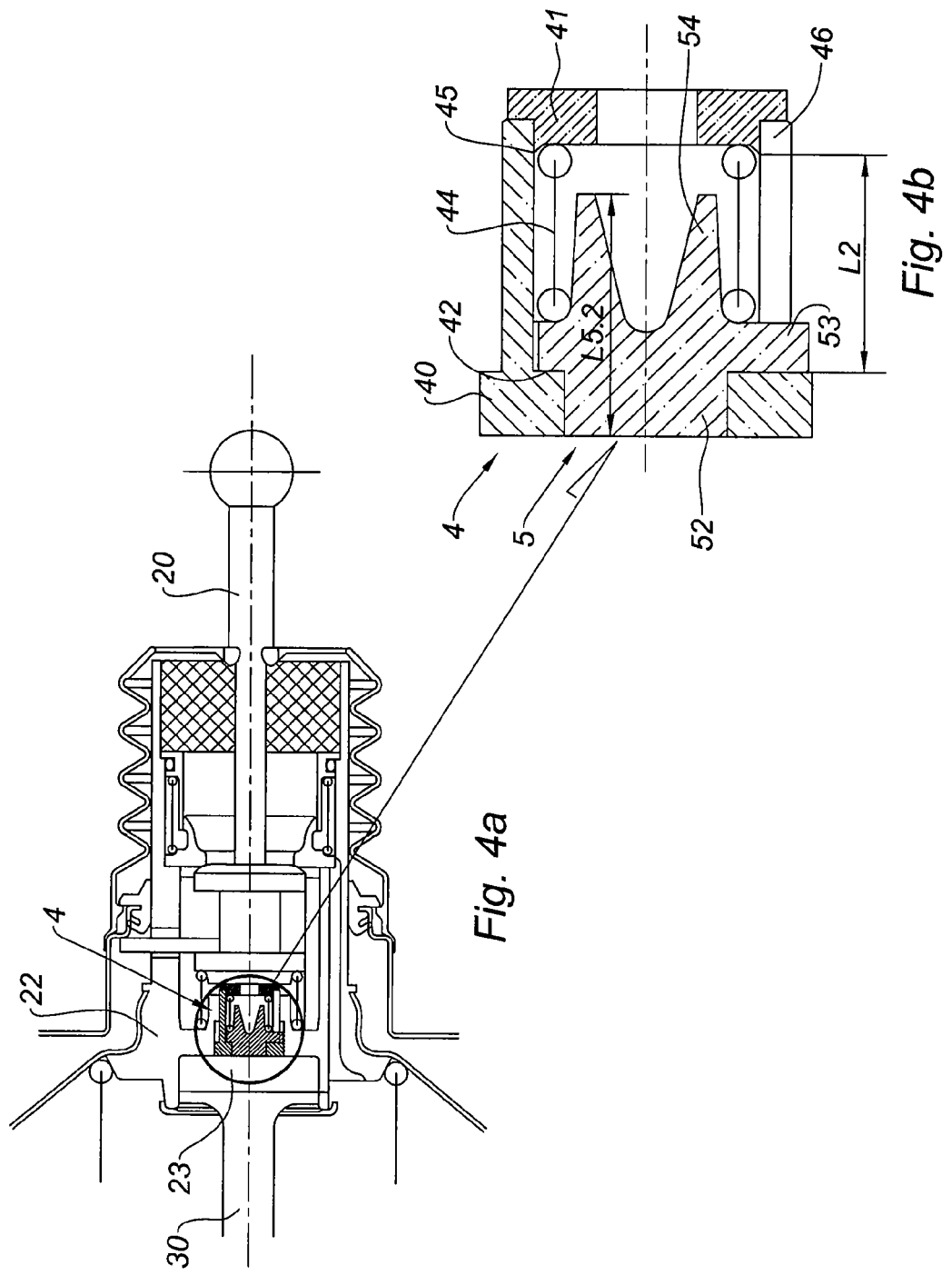

BRAKE BOOST SENSOR FEELER

BACKGROUND AND SUMMARY OF THE INVENTION

The invention relates to a brake booster with a variable boost ratio. The invention is more particularly applicable to brake boosters for motor vehicles.

A brake booster like the one depicted in FIG. 1 essentially comprises, in a sealed casing 10, two chambers (the front chamber 10av and the rear chamber 10ar) which are separated by a moving membrane 14.

A control rod 20 can move towards the front of the vehicle (in the direction of arrow F1 in FIG. 1) when the driver of the vehicle depresses the brake pedal. This movement of the control rod 20 is transmitted to a slide valve plunger 21 which actuates boost means. As is known in the art, these boost means generally comprise a three-way valve, actuation of which makes it possible either to place the front chamber 10av of the booster in communication with the rear chamber 10ar, or to interrupt this communication, or to place the rear chamber in communication with the surrounding atmosphere.

The front chamber 10av is normally under vacuum. At rest (when there is no brake command), the two, front and rear, chambers are in communication with one another and the same pressure is obtained in each of the two chambers.

When the driver depresses the brake pedal, the control rod 20 is moved forward (to the left in the figure). The slide valve plunger 21 is moved forward and causes the three-way valve to operate. This valve isolates the two, front and rear, chambers and places the rear chamber in communication with atmospheric pressure.

Because of the difference in pressure between the two chambers, a boost force is applied to the moving membrane 14 separating the two chambers. This moving membrane 14 is associated with a skirt 15 made of a rigid material. Under the effect of the boost force, the moving membrane tends to move forward and carries the skirt 15 along with it.

The skirt 15 itself carries along the piston 22 which therefore moves forward (in the direction of the arrow F1), acting on a push rod 30 which serves to actuate a piston of the master cylinder 61 of the braking circuit.

In the conventional way, in a booster design such as this, the slide valve plunger 21 slides in a bore of the hub of the piston 22 and forms a thrust member acting on a reaction disk 23 which transmits force to the push rod 30.

This reaction disk 23 rests against the front face of the plunger and against the front face of the piston surrounding the plunger.

In a system such as this, the brake booster has a fixed boost ratio. However, under certain operating circumstances, for example in the event of emergency braking, it may be advantageous to provide a boost force as early as possible.

This is why, in some systems, there is, between the control rod 20 and the reaction disk 23, a sensor feeler which slides in a cylinder able to move axially inside the piston. FIGS. 2a and 2b depict a system such as this which is described, for example, in Patent EP 1 322 510.

In this system, there is therefore a sensor feeler 31 able to move axially inside a cylinder 34 which is able to move axially inside the piston 22. The spring 32 tends to push the cylinder 34 to the left and to bring the end 35 of the sensor feeler 31 closer to the left-hand end of the cylinder 34. In that system, the force of the control rod 20 is exerted via the slide valve plunger 21 on the sensor feeler 31.

The invention relates to an improvement to this type of device that has the advantage of being easier to manufacture and of reducing the time taken to assemble the booster.

The invention therefore relates to a sensor feeler device for a brake booster, comprising:
a pneumatic control device controlled by a three-way valve,
a slide valve plunger providing control of the pneumatic control device,
a control rod intended to apply an axial movement force to the slide valve plunger,
a piston able to move axially under the control of the pneumatic control device,
a push rod receiving axial movement forces from said moving piston and from the slide valve plunger and forwarding them to a brake master cylinder,
a reaction disk positioned between the control rod and the push rod,
a sensor feeler device able to move axially and situated between the reaction disk and the control rod.

According to the invention, the sensor feeler device comprises:
an axially moveable cylinder the movement of which can be controlled by the control rod,
a sensor feeler piston able to move axially in said moving cylinder,
a spring that tends to push the sensor feeler piston forward and keep its front face substantially in the same plane as the front face of the moving cylinder.

According to one advantageous embodiment of the invention, the moving cylinder comprises a cavity capable of accepting, such that it can slide axially, the moving sensor feeler piston. The moving cylinder comprises a shoulder that forms a stop for a thrust piece of the sensor feeler piston and limits the forward movement of the sensor feeler piston.

In addition, the moving cylinder advantageously comprises a rear part. Said spring rests, on the one hand, against this rear part and, on the other hand, against the sensor feeler piston.

According to one embodiment, said rear part is welded to the moving cylinder.

According to another form of embodiment, the said rear part and the moving cylinder are made as one piece.

Provision may also be made for the side wall of the moving cylinder to comprise an aperture to allow the thrust piece of the sensor feeler piston to slide.

Advantageously, provision will also be made for the rear part to comprise a first axial boss for centering the spring.

According to an alternative form of embodiment, the sensor feeler piston has a second axial boss also for centering the spring.

To allow the plunger piston to be fitted into the moving cylinder, the axial length of the aperture and the distance separating the front face of the first boss from the shoulder of the moving cylinder are both greater than the total axial length of the plunger piston. In this embodiment, in which the plunger piston and the thrust piece are made in two parts, provision may be made for this distance simply to be greater than the thickness of the thrust piece of the plunger piston.

In this form of embodiment, said aperture is wide enough to allow the thrust piece of the plunger piston through.

According to an alternative form of embodiment of the invention, the height of the aperture is greater than the total axial length of the plunger piston, of its thrust piece and of its boss.

Provision may also be made for the plunger piston and its shoulder to be made in two parts.

BRIEF DESCRIPTION OF THE DRAWINGS

The various objects and features of the invention will become more clearly apparent in the following description and in the attached drawings which depict:

FIG. 1: a brake booster of the known art to which the invention applies;

FIGS. 2a and 2b: a device, known from the art, for transmitting forces between the control rod driven by the brake pedal, on the one hand, and the reaction disk, on the other;

FIGS. 3a and 3b: a device for transmitting forces, according to the invention, between the control rod driven by the brake pedal, on the one hand, and the reaction disk, on the other;

FIGS. 4a and 4b: an alternative form of embodiment of the device of FIGS. 3a and 3b.

DETAILED DESCRIPTION

With reference to FIGS. 3a and 3b, there will first of all be described one exemplary embodiment according to the invention of a device for transmitting forces between the piston of the booster and the slide valve plunger driven by the control rod on the one hand and the reaction disk associated with the push rod controlling the pistons of the master cylinder, on the other.

This device applies to a brake booster like that of FIG. 1. These FIGS. 3a and 3b depict only that part of the booster that contains the device of the invention. The components depicted in FIGS. 3a and 3b bear the same references as those components of FIGS. 1, 2a, 2b that perform the same functions.

By convention, in this description, the terms "front" and "rear" relate respectively to "left" and "right" in the attached figures.

These figures then show the control rod 20 which controls the movement of the slide valve plunger 21 which initiates operation of the brake booster and causes its piston 22 to move under the effect of the difference in pressure between the front and rear chambers of the booster. They also show the reaction device (reaction disk) 23 and the push rod 30 which forward the forces to the pistons of the master cylinder, and vice versa.

The slide valve plunger 21 presses against the reaction disk via a sensor feeler 4.

This sensor feeler comprises a cylinder 40 able to move axially in a bore belonging to the piston 22. The moving cylinder 40 contains an axially moveable sensor feeler piston 5.

The sensor feeler piston 5 comprises a moving piston 50 and a thrust piece 51 the forward movement of which is restricted by a shoulder 42 belonging to the moving cylinder.

A spring 44 rests against a wall 45 of the rear part 41 of the moving cylinder and tends to keep the sensor feeler over toward the left by pressing against the thrust piece 51.

A central boss 47 centers the spring 44 in the moving cylinder.

According to this design of sensor feeler 4, the thrust force exerted by the slide valve plunger 21 to the push rod 30, is transmitted mainly by the moving cylinder 40. The reaction from the master cylinder will be applied to the moving piston 50 of the sensor feeler via the reaction disk.

The system of the invention differs from the prior art in which the thrust force from the control rod is exerted by the moving sensor feeler (31 in FIGS. 2a and 2b).

In this design, the sensor feeler 4 may then be made as a one-piece entity.

According to a first embodiment, the rear part 41 may be welded or bonded, at points 48 and 49, to the body of the moving cylinder once the moving piston 50 and the thrust piece 51 have been fitted into the bore 43 of the moving cylinder.

According to a second embodiment, the body of the moving cylinder and the rear part 41 are made as a single piece. The moving piston 50 and the thrust piece 51 are mounted inside the bore 43 by inserting them through the opening 46 made in the wall of the moving cylinder.

In order for that to be possible, the dimension L1 of the opening and the distance L4 separating the boss 47 from the shoulder 42 need both to be greater than the axial length L5.1 of the piston 50 of the sensor feeler and of the thrust piece 51.

FIGS. 4a and 4b depict an alternative form of embodiment of the plunger 5 according to the invention.

In this alternative form, the piston of the plunger and the thrust piece are made as a single piece 52. The plunger piston therefore has a shoulder 53 which limits its forward movement. In addition, in FIGS. 4a and 4b, it is the piston 52 of the plunger that has a boss 54, rather than the wall 45 of the rear part 41 of the moving cylinder 4, for centering the spring 44.

As in the embodiment of FIGS. 3a and 3b, the rear part 41 is welded or bonded to the body of the moving cylinder.

When the rear part 41 and the body of the moving cylinder are made as a single piece, the dimension L2 of the aperture 46 needs to be greater than the axial dimension L5.2 of the plunger 5 so as to allow it to be mounted in the moving cylinder 4.

The invention claimed is:

1. A brake booster with a variable boost ratio comprising:
   a pneumatic control device (10, 14, 15) controlled by a three-way valve,
   a slide valve plunger (21) providing control of the pneumatic control device,
   a control rod (20) intended to apply an axial movement force to the slide valve plunger,
   a piston (22) able to move axially under the control of the pneumatic control device,
   a push rod (30) receiving axial movement forces from said moving piston and from the slide valve plunger (21) and forwarding the forces to a brake master cylinder,
   a reaction disk (23) positioned between the control rod (20) and the push rod (30), and
   a sensor feeler device (4) able to move axially and situated between the reaction disk (23) and the control rod (20), the sensor feeler device (4) comprising:
   an axially moveable cylinder (40) the movement of which can be controlled by the control rod,
   a rear part (41) separate from the axially moveable cylinder (40) and one of welded and bonded to the axially moveable cylinder (40),
   a sensor feeler piston (5) able to move axially in the axially moveable cylinder (40),
   a spring (44) that tends to push the sensor feeler piston (5) forward and keep its front face substantially in the same plane as a front face of the axially moveable cylinder.

2. The brake booster according to claim 1, characterized in that the axially moveable cylinder (40) comprises a cavity (43) capable of accepting, such that it can slide axially, the moving sensor feeler piston (5), the axially moveable cylinder (40) comprising a shoulder (42) that forms a stop for a thrust piece (51) of the sensor feeler piston (5) and limits the forward movement of the sensor feeler piston.

3. The brake booster according to claim 2, characterized in that the spring (44) rests, on the one hand, against the rear part (41) and, on the other hand, against the sensor feeler piston (5).

4. The brake booster according to claim 3, characterized in that the rear part (41) comprises an axial boss (47) for centering the spring (44).

5. The brake booster according to claim 4, characterized in that the side wall of the moving cylinder (40) comprises an aperture (46), and characterized in that an axial length (L1) of the aperture (46) and a distance (L4) separating a front face of the boss (47) from the shoulder (42) of the axially moveable cylinder (40) are both greater than a total axial length (L5.1) of the sensor feeler piston (5).

6. The brake booster according to claim 5, characterized in that said aperture (46) is wide enough to allow the thrust piece (51) of the sensor feeler piston (5) through.

7. The brake booster according to claim 3, characterized in that the sensor feeler piston (5) has an axial boss (54) for centering the spring (44).

8. The brake booster according to claim 7, characterized in that the sensor feeler piston (5) has a plunger piston (52) and a shoulder (53), characterized in that the side wall of the moving cylinder (40) comprises an aperture (46), and characterized in that an axial length (L2) of the aperture (46) is greater than a total axial length of the plunger piston (52), of its shoulder (53) and of its boss (54).

9. The brake booster according to claim 3, characterized in that the sensor feeler piston (5) includes a plunger piston (50) and the thrust piece (51) made in two parts.

10. The brake booster according to claim 9, characterized in that the side wall of the moving cylinder (40) comprises an aperture (46), and characterized in that an axial length (L1) of the aperture (46) and a distance (L4) separating a front face of an axial boss (47) from the shoulder (42) of the moving cylinder are both greater than a thickness of the thrust piece (51) of the plunger piston (50).

11. Brake booster with a variable boost ratio comprising:
- a pneumatic control device (10, 14, 15) controlled by a three-way valve,
- a slide valve plunger (21) providing control of the pneumatic control device,
- a control rod (20) intended to apply an axial movement force to the slide valve plunger,
- a piston (22) able to move axially under the control of the pneumatic control device,
- a push rod (30) receiving axial movement forces from said moving piston and from the slide valve plunger (21) and forwarding the forces to a brake master cylinder,
- a reaction disk (23) positioned between the control rod (21) and the push rod (30), and
- a sensor feeler device (4) able to move axially and situated between the reaction disk (23) and the control rod (20), the sensor feeler device (4) comprising:
- an axially moveable cylinder (40) the movement of which can be controlled by the control rod,
- a rear part (41) welded or bonded to the axially moveable cylinder (40) to form a single piece,
- a sensor feeler piston (5) able to move axially in axially moveable cylinder (40),
- a spring (44) that tends to push the sensor feeler piston (5) forward and keep its front face substantially in the same plane as a front face of the axially moveable cylinder, characterized in that a side wall of the cylinder (40) comprises an aperture (46) to allow the thrust piece (51) of the sensor feeler piston (5) to slide therethrough.

12. A sensor feeler device (4) for a brake booster with a variable boost ratio, the brake booster including a pneumatic control device (10, 14, 15) controlled by a three-way valve, a slide valve plunger (21) providing control of the pneumatic control device, a control rod (20) intended to apply an axial movement force to the slide valve plunger, a piston (22) able to move axially under the control of the pneumatic control device, a push rod (30) receiving axial movement forces from said moving piston and from the slide valve plunger (21) and forwarding the forces to a brake master cylinder, a reaction disk (23) positioned between the control rod (20) and the push rod (30), the sensor feeler device (4) being able to move axially and situated between the reaction disk (23) and the control rod (20), the sensor feeler device (4) comprising:
- an axially moveable cylinder (40) the movement of which can be controlled by the control rod,
- a rear part (41) separate from the axially moveable cylinder (40) and connected to the axially moveable cylinder (40),
- a sensor feeler piston (5) able to move axially in the axially moveable cylinder (40),
- a spring (44) that tends to push the sensor feeler piston (5) forward and keep its front face substantially in the same plane as a front face of the axially moveable cylinder.

13. Sensor feeler device according to claim 12, characterized in that the axially moveable cylinder (40) comprises a cavity (43) capable of accepting, such that it can slide axially, the moving sensor feeler piston (5), the axially moveable cylinder (40) comprising a shoulder (42) that forms a stop for a thrust piece (51) of the sensor feeler piston (5) and limits the forward movement of the sensor feeler piston.

14. Sensor feeler device according to claim 13, characterized in that the spring (44) rests, on the one hand, against the rear part (41) and, on the other hand, against the sensor feeler piston (5).

15. Sensor feeler device according to claim 14, characterized in that the rear part (41) has an axial boss (47) for centering the spring (44).

16. Sensor feeler device according to claim 14, characterized in that the sensor feeler piston (5) has an axial boss (54) for centering the spring (44).

17. Sensor feeler device according to claim 12, characterized in that the rear part (41) is one of welded and bonded to the axially moveable cylinder (40).

18. Sensor feeler device according to claim 12, characterized in that the sensor feeler piston (5) includes a thrust piece (51), and characterized in that a side wall of the axially moveable cylinder (40) comprises an aperture (46) to allow the thrust piece (51) of the sensor feeler piston (5) to slide therethrough.

19. A sensor feeler device (4) for a brake booster with a variable boost ratio, the brake booster including a pneumatic control device (10, 14, 15) controlled by a three-way valve, a slide valve plunger (21) providing control of the pneumatic control device, a control rod (20) intended to apply an axial movement force to the slide valve plunger, a piston (22) able to move axially under the control of the pneumatic control device, a push rod (30) receiving axial movement forces from said moving piston and from the slide valve plunger (21) and forwarding the forces to a brake master cylinder, a reaction disk (23) positioned between the control rod (21) and the push rod (30), the sensor feeler device (4) being able to move axially and situated between the reaction disk (23) and the control rod (20), the sensor feeler device (4) comprising:
- an axially moveable cylinder (40) the movement of which can be controlled by the control rod, a side wall of the cylinder (40) defining an aperture (46), a rear part (41) connected to the axially moveable cylinder (40) to form a single piece, a sensor feeler piston (5) able to move axially in the axially moveable cylinder (40), the aperture (46) allowing at least a portion of the sensor feeler piston (5) to slide therethrough, a spring (44) that tends to push the sensor feeler piston (5) forward and keep its front face substantially in the same plane as a front face of the axially moveable cylinder.

20. Sensor feeler device according to claim 19, characterized in that the sensor feeler piston (5) includes a thrust piece (51), and characterized in that the aperture (46) allows the thrust piece (51) of the sensor feeler piston (5) to slide.

21. Sensor feeler device according to claim 20, characterized in that the axially moveable cylinder (40) comprises a shoulder (42) that forms a stop for the thrust piece (51) of the sensor feeler piston (5) and limits the forward movement of the sensor feeler piston (5), characterized in that the rear part (41) has an axial boss (47) for centering the spring (44), and characterized in that an axial length (L1) of the aperture (46) and a distance (L4) separating a front face of the axial boss (47) from the shoulder (42) are both greater than a thickness of the thrust piece (51).

22. Sensor feeler device according to claim 20, characterized in that said aperture (46) is wide enough to allow the thrust piece (51) of the plunger piston (5) through.

23. Sensor feeler device according to claim 19, characterized in that the sensor feeler piston (5) has a plunger piston (52), a shoulder (53) and an axial boss (54), and characterized in that the aperture (46) allows the plunger piston (52), the shoulder (53) and the axial boss (54) to slide therethough.

24. Sensor feeler device according to claim 23, characterized in that an axial length (L2) of the aperture (46) is greater than a total axial length of the plunger piston (52), of its shoulder (53) and of its boss (54).

25. Sensor feeler device according to claim 19, characterized in that the axially moveable cylinder (40) comprises a shoulder (42) that forms a stop for a thrust piece (51) of the sensor feeler piston (5) and limits the forward movement of the sensor feeler piston, characterized in that the rear part (41) has an axial boss (47) for centering the spring (44), and characterized in that an axial length (L1) of the aperture (46) and a distance (L4) separating a front face of the axial boss (47) from the shoulder (42) are both greater than a total axial length (L5.1) of the sensor feeler piston (5).

26. Sensor feeler device according to claim 19, characterized in that the said rear part (41) and the moving cylinder (40) are made as one piece.

27. Sensor feeler device according to claim 19, characterized in that the rear part (41) is separate from and one of welded and bonded to the axially moveable cylinder (40).

* * * * *